(12) United States Patent
Guillain et al.

(10) Patent No.: US 6,399,129 B1
(45) Date of Patent: Jun. 4, 2002

(54) COOKING AID OF THE LUMP TYPE

(75) Inventors: Valérie Guillain, Beauvais; Yannick Mahe, Winterthur, both of (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/109,128

(22) Filed: Jul. 2, 1998

(30) Foreign Application Priority Data

Jul. 4, 1997 (EP) .............................. 97202060

(51) Int. Cl.⁷ ............................ A23L 1/03; A23L 1/05
(52) U.S. Cl. ...................... 426/293; 426/98; 426/99; 426/302
(58) Field of Search .................. 426/102, 209, 426/291, 295, 98, 293, 302, 99

(56) References Cited

U.S. PATENT DOCUMENTS

| | | | | |
|---|---|---|---|---|
| 3,395,024 A | * | 7/1968 | Earle | 99/169 |
| 3,653,924 A | * | 4/1972 | Penton | 99/168 |
| 3,769,029 A | * | 10/1973 | Ganz | 426/342 |
| 3,856,699 A | * | 12/1974 | Miyano et al. | 252/316 |
| 3,966,993 A | * | 6/1976 | Luck | 426/589 |
| 3,987,207 A | * | 10/1976 | Spaeti et al. | 426/99 |
| 4,060,645 A | * | 11/1977 | Risler et al. | 426/302 |
| 4,415,599 A | * | 11/1983 | Bos | 426/578 |
| 4,504,502 A | * | 3/1985 | Earle et al. | 426/293 |
| 4,567,047 A | * | 1/1986 | SCM Corporation | 426/94 |
| 4,769,247 A | * | 9/1988 | Rothenberg et al. | 426/291 |
| 4,880,649 A | * | 11/1989 | Holzner et al. | 426/302 |
| 4,946,693 A | | 8/1990 | Risler et al. | 426/243 |
| 5,190,775 A | * | 3/1993 | Klose | 426/2 |
| 5,332,585 A | | 7/1994 | Odermatt et al. | 426/96 |
| 5,451,421 A | | 9/1995 | Tanihara et al. | 426/589 |

FOREIGN PATENT DOCUMENTS

| | | |
|---|---|---|
| CA | 913451 | 11/1970 |
| CA | 2193402 | 6/1997 |

* cited by examiner

Primary Examiner—Arthur L. Corbin
(74) Attorney, Agent, or Firm—Winston & Strawn

(57) ABSTRACT

Cooking aid of the lump type having the shape of a lump with a granular surface and comprising a flavoring core and a coating of a binding base and visual components. Also, a process for preparing this cooking aid.

9 Claims, 1 Drawing Sheet

COOKING AID OF THE LUMP TYPE

BACKGROUND ART

The subject of the present invention is a cooking aid of the lump type, a process for its preparation and an apparatus for carrying out the process.

U.S. Pat. No. 4,060,645 to Risler et al. describes a dehydrated product in the form of grains which are instantly soluble in water, and have a continuous porous structure and a smooth surface. These products can be obtained by extruding, in a vessel where a subatmospheric pressure exists, a food material comprising fruit, vegetable or seed extracts, starches, gums or alginates, meat, fish or yeast extracts, and/or protein hydrolysates.

U.S. Pat. No. 4,946,693 to Risler et al. describes a food product consisting of a dehydrated mass in the form of a powder or of flakes of milk, fat, gelatinized starch, meat and vegetable extracts or protein hydrolysates, and of a filling of partially dehydrated vegetable, meat or pasta pieces. The filling is packaged separately from the dehydrated mass.

SUMMARY OF THE INVENTION

The aim of the present invention is to provide a cooking aid in an attractive form having, at the surface, visually identifiable pieces of vegetables, meat or other materials or fillings and comprising fat and/or a polysaccharide and pulverulent flavoring ingredients.

To this effect, a cooking aid of the lump type according to the present invention has the shape of a lump with a granular surface and comprises a flavoring core and a coating comprising a binding base and the visually identifiable components.

The invention also relates to a process for the preparation of a cooking aid of the lump type, comprising the steps of:
  preparing a flavoring core;
  conditioning the core at temperature of about 5–25° C.;
  preparing a binding base;
  adding visual components to the binding base; and
  coating the flavoring core with the binding base and visual components.

The process further comprises conditioning the core at temperature of about 5–25° C. before coating with the binding base and visual components. The flavoring core may be prepared by mixing together about 30–50 parts of salt, about 10–20 parts of glutamate, and about 10–20 parts of fat. The binding base may be prepared by mixing a fat with a viscosity increasing component, such as a starch, maltodextrin, gum or alginate.

The cooking aid of the lump type according to the present invention therefore effectively has, at the surface, visually identifiable pieces of vegetables, meat or other filling in an attractive granular form.

The process and apparatus according to the present invention make it possible to prepare this cooking aid of the lump type in a simple manner and in a limited number of steps.

BRIEF DESCRIPTION OF THE DRAWING

To carry out the process for the preparation of a cooking aid of the lump type according to the present invention, the procedure may be carried out in two phases as have been illustrated, by way of example, in FIG. 1 of the accompanying drawing, which is a schematic illustration of the process of the invention.

DETAILED DESCRIPTION OF THE INVENTION

Figure 1:
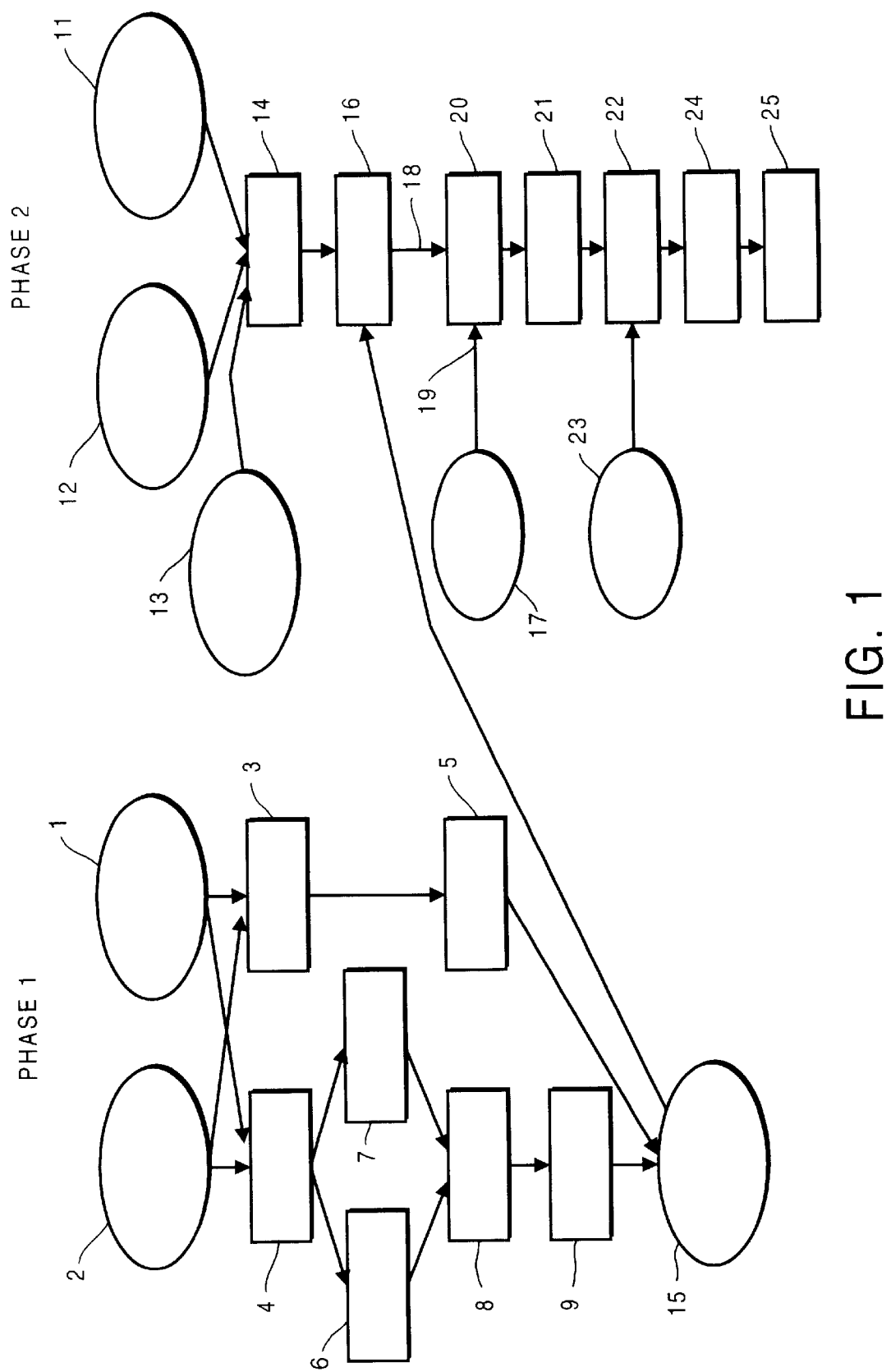

In the present disclosure, the expression "in the form of a lump" should be understood as having the shape of a lump which is small in size, has a square cross-section and is on the order of a few cm long.

The expression "granular surface" should be understood as a surface having asperities of a size which is comparable to that of the visual components.

The expression "visual components" should be understood as components whose size is sufficiently large and whose color exhibits sufficient contrast relative to that of the combination to be distinguished by the naked eye.

In the cooking aid of the lump type according to the present invention, the visual components may be dehydrated pieces of any food product which can be taken into consideration as a filling.

These visual components may be in particular pieces of one or more vegetables, fruits, aromatic herbs, meats, fish and/or crustacea, spices and/or whole or crushed seeds.

The flavoring core may comprise about 30–50 parts of salt, about 10–20 parts of glutamate, about 10–20 parts of fat, a few parts of neutral mass, and, if desired, a supplement of flavoring substances.

The binding base may consist of a mixture of various fats combined or otherwise with other components intended to increase the viscosity thereof, such as starches, maltodextrins, gums or alginates.

By way of example, there may be mentioned a binding base comprising about 25% of maize starch, about 20% of sunflower oil and about 55% of hydrogenated palm fat having a melting point of 43–47° C. It is also possible to use a binding base consisting of an aqueous solution of starches, maltodextrins, gums or alginates.

Preferably, the components of the binding base are chosen such that it exhibits a highly sticky character, in order to be able to fix the visual components thereto, which character should then disappear either upon cooling, in the case where the binding base consists of a mixture of different fats, or upon drying, in the case where the binding base consists of a solution of starches, maltodextrins, gums or alginates.

Accordingly, a suitable mixture of different fats is preferably liquid at a working temperature of about 50–60° C. and solid at room temperature.

It is also possible to envisage overcoating with the aid of fat, in particular in order to exert a positive effect on the preservation qualities of the cooking aid.

A preferred process for the preparation of a cooking aid of the lump type according to the present invention comprises the successive steps of:
  mixing the components of the core,
  conditioning the core component mixture at about 5–25° C.,
  shaping the mixture,
  mixing the components of the binding base,
  coating the core with the binding base mixture, and
  fixing the visual components in the binding base.

An apparatus for carrying out the process for the preparation of a cooking aid of the lump type according to the present invention comprises a device for mixing the components of the core, a device for shaping the core components mixture, a device for mixing the components of the binding base and a device for fixing the visual components in the binding base.

FIG. 1 is a schematic illustration of the process of the invention. In a first phase of preparation of the flavoring core 15, it is possible either to mix the components, i.e., the powder and crystalline materials 1 and a fat 2 such as those used for the preparation of hard tablets of broth, in particular in a Lödige type mixer 3, to condition/adjust the temperature to about 5–25° C. and then tablet, in particular on a Fette or Bonals type press 5, or to mix the components i.e., fat 2 and powder and crystalline materials 1 such as those used for the preparation of soft forms of broth, in particular in a Kréber type band mixer 4, optionally store at room temperature, shape by extrusion 7 or laminating 6 or cutting 8, and cooling 9.

In a second phase of preparation of a binding base and coating, the binding base may be prepared either by dispersion of starches, maltodextrins, gums or alginates 11 in water 12, or by liquefaction of fat 13 by means of a propeller mixer 14.

The core 15 can then be coated by complete immersion 16 in the binding base or by aspersion combined with partial dipping, the temperature of a base consisting of fat being kept above its melting point, for example. It is possible to fix 20 the visual components 17 onto the lump coated with binding base and transferred onto a mesh band 18 by dispersing them on top by means of a shaking conveyor 19.

Depending on whether the binding base consists of fat or of starches or other colloids, the lump may then be cooled 21 by passing through a tunnel featuring circulation of cooled air, in particular at about 5° C., or dried in a hot-air drier.

The lump can be overcoated, in particular with the aid of a falling stream coating machine 22, with a liquefied fat 23 optionally containing colorings.

After preparing and cooling 24, the lump can then be packaged in a "flow pack" packaging 25.

What is claimed is:

1. A process for the preparation of a cooking aid of the lump type, comprising the steps of:

preparing a flavoring core consisting essentially of about 30–50 parts of salt, about 10–20 parts of glutamate, and about 10–20 parts of fat;

preparing a binding base by mixing a fat with a viscosity increasing component;

adding visual components to the binding base; and coating the prepared flavoring core with the binding base and visual components to form the cooking aid.

2. The process of claim 1 which further comprises conditioning the core at temperature of about 5–25° C. before coating with the binding base and visual components.

3. The process of claim 1 wherein the flavoring core is prepared by mixing together the salt, glutamate, and fat at a temperature of 5–25° C.

4. The process of claim 1, wherein the viscosity increasing component is a starch, maltodextrin, gum or alginate.

5. The process of claim 1 wherein the visual components are vegetables, fruits, meats, fish, crustacea, herbs, spices, or seeds.

6. A process for the preparation of a cooking aid, comprising:

preparing a flavoring core consisting essentially of about 30 to 50 parts of salt, about 10 to 20 parts of glutamate, and 10 to 20 parts of fat;

preparing a binding base by mixing a fat with a viscosity increasing component;

coating the prepared flavoring core with the binding base; and fixing visual components to the binding base, the visual components being sufficiently large and having a color sufficiently in contrast relative to the cooking aid to be distinguished by the naked eye.

7. The process of claim 6, wherein the flavoring core is coated by immersion in the binding base.

8. The process of claim 6, wherein the visual components are fixed to the binding base by a shaking conveyor.

9. The process of claim 6, wherein the binding base comprises about 25% maize starch, about 20% sunflower oil, and about 55% hydrogenated palm fat.

* * * * *